United States Patent [19]

Nyiri et al.

[11] 3,926,738

[45] Dec. 16, 1975

[54] METHOD AND APPARATUS FOR CONTROL OF BIOCHEMICAL PROCESSES

[75] Inventors: John D. Wilson, Mertztown; New Brunswick Scientific Co., Inc., New Brunswick, N.J.

[73] Assignees: New Brunswich Scientific Co., Inc., New Brunswich, N.J.

[22] Filed: May 10, 1972

[21] Appl. No.: 251,959

[52] U.S. Cl. ................ 195/127; 195/139; 195/142; 195/143
[51] Int. Cl.$^2$ .......................................... C12B 1/00
[58] Field of Search .......... 195/139, 142, 108, 109, 195/117, 115, 127, 103.5, 104, 143, 140, 141, 144, 118

[56] References Cited
UNITED STATES PATENTS

| | | | |
|---|---|---|---|
| 3,586,605 | 6/1971 | Hosler | 195/28 |
| 3,684,702 | 8/1972 | Hartmann | 195/103.5 |

FOREIGN PATENTS OR APPLICATIONS

| | | | |
|---|---|---|---|
| 4,518,273 | 6/1970 | Japan | 195/109 |

OTHER PUBLICATIONS

Grayson et al., "The Control of Biological Reactors," Symposium on Biochem. Eng. at Bath Univ. 1971.

Sakaguchi et al., *Biochemical and Industrial Aspects of Fermentation*, Kodansha Ltd., Tokyo, (1971), pp. 267–296.

Perlman et al., *Fermentation Advances*, Academic Press, New York, London (1969), pp. 441–448, 453–463, Chem. Abstracts, 73 86 475(a).

Aiba, S. et al., *Biochemical Engineering*, Academic Press, N.Y., 1965, pp. 245, 246, 254, 255, 259.

*Primary Examiner*—Alvin E. Tanenholtz
*Assistant Examiner*—Thomas G. Wiseman
*Attorney, Agent, or Firm*—Blum, Moscovitz, Friedman & Kaplan

[57] ABSTRACT

Biochemical processes are controlled by detecting a plurality of selected controllable variables and dependent variables and actuating controllers for maintaining said controllable variables within predetermined tolerance values in response to said detected controllable variable values and a time profile of each of said tolerance limits. On-line, real-time computer calculations are performed to determine the status of said process from said detected dependent and controllable variable values. Said controllers may be manually or automatically actuated in response to said calculated status, or the time-profiles of the tolerance values may be automatically or manually adjusted in response to said calculated status.

9 Claims, 5 Drawing Figures

METHOD AND APPARATUS FOR CONTROL OF BIOCHEMICAL PROCESSES

BACKGROUND OF THE INVENTION

This invention relates to the control of biochemical processes, catalyzed by a nondefined number of enzymes and in particular to control cell propagation and cellular metabolism in submerged cultures.

It has long been known that biochemical processes are greatly affected by environmental factors. While sophisticated instrumentation is now available for detecting many of these environmental factors, efficient control of such processes necessary to insure repeatability and to insure proper scaling-up of the process from experimental to commercial levels has proved difficult. One principal cause of this difficulty was the lack of precise information of the status and characteristics of the process at various intermediate stages thereof. While biochemical processes are relatively slow, the presently utilized simulation and off-line optimization approaches have not provided the necessary amount of information for the process identification which is the prerequisite of the appropriate process control. A further complication is the fact that the various controllable and dependent variables (hereinafter referred to as state variables) can interact in either synergistic or antagonistic ways. Accordingly, means must be found to detect the interactions in order to perform suitable control of the controllable variables in each biochemical process.

SUMMARY OF THE INVENTION

Generally speaking, in accordance with the invention, a method and an apparatus are provided for process dynamics identification and control of the biochemical processes wherein a plurality of selected controllable and state variables are detected. Controllers for each of said selected controllable variables are provided adapted to maintain each of said controllable variables within set tolerance levels. Means are provided for varying said tolerance levels in said controllers along time profiles. Calculating means are provided for real-time, on-line calculation of further state variables representative of the status of the process from said detected state and controllable variables.

Means may be provided for adjusting said time profiles in response to said calculated further state variable values, said means being either manual or automatic. In an alternate embodiment, control of each controllable variable value is automatically performed in response to said calculated further state variable values which identify the status of the process.

Processes related to cell propagation and cellular metabolism may be regulated through detection of controllable variables including temperature of culture liquid and liquids in addition vessels, vessel pressure, agitation speed, sparge air rate, flow rate of addition gases, dissolved oxygen concentration of culture liquid, pH of the culture, and rate of addition of ingredients from the addition vessels. Means may also be provided for real-time analysis of actual samples of the culture liquid.

Accordingly, it is an object of the invention to provide a process for obtaining substantial amounts of information to identify the status of biochemical processes which permits controlling of intermediate stages of the process and substantially continuous control over the environment in which the process is performed in response to such process dynamics identification.

Another object of the invention is to provide a process and apparatus particularly adapted for the interactive control of processes related to cell propagation and cellular metabolism.

A further object of the invention is to provide a process and apparatus for analyzing and controlling biochemical processes which will insure the repeatability and accurate scale-up of the process.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
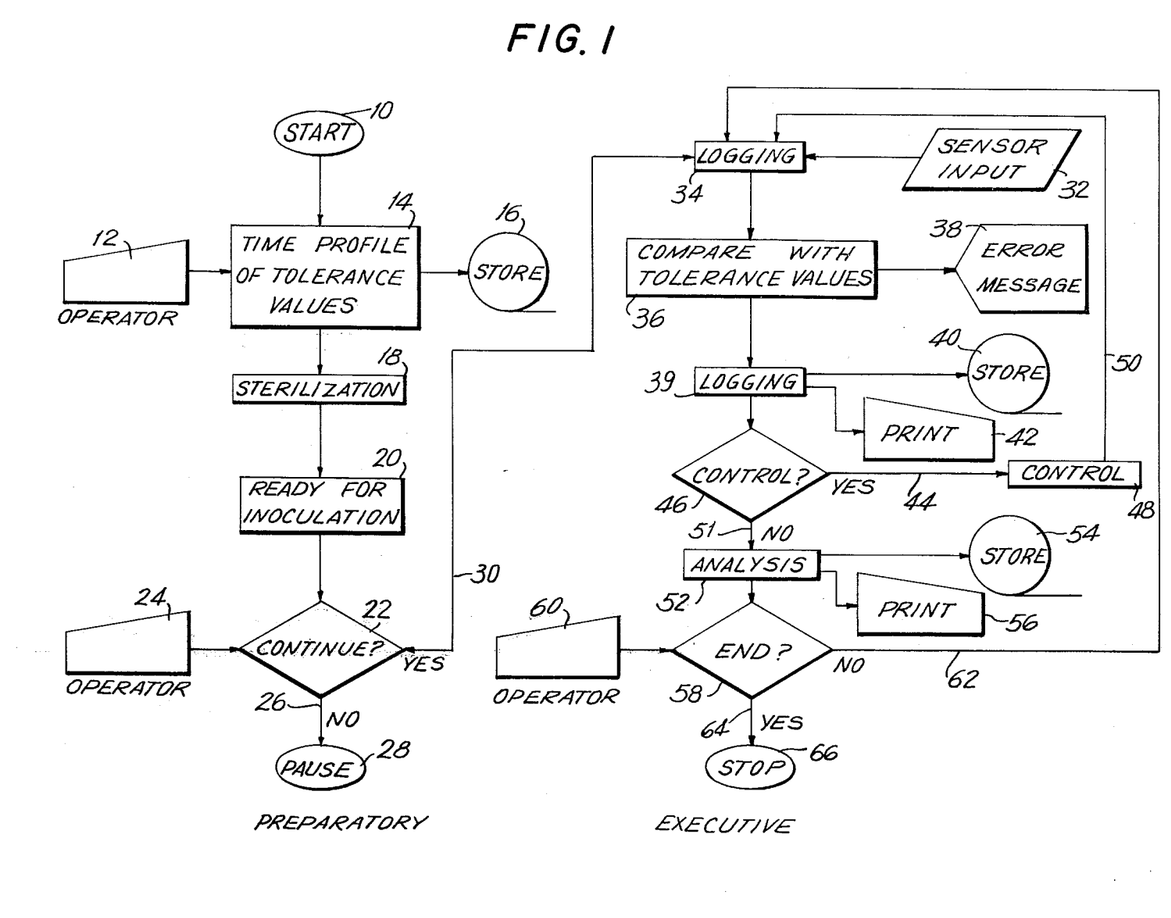
FIG. 1 is a flow chart illustrating one embodiment of the procedure for analyzing and controlling biochemical processes in accordance with the invention.

A procedure to perform data acquisition, data analysis and process control of biochemical processes is depicted in the flow chart of FIG. 1. This consists of two phases, a preparatory phase and an executive phase. Both of these phases are preferably performed by means of a digital computer system having command, calculating, storage and print-out capabilities in response to a suitable program. The computer system would be tied to the biochemical process apparatus and its instrumentation through a suitable interface device.

The preparatory phase is initiated by a start command illustrated by block 10. The environmental factors affecting biochemical processes are generally controllable, and through control of these factors, ultimate control of the process is possible. These environmental factors are hereinafter referred to as controllable variables. Examples of such controllable variables are temperature, pressure, agitation speed, flow rate of addition gases, rate of addition of ingredients from addition vessels, and pH of the culture. In the process in accordance with the invention, each of these controllable variables is maintained within a range of tolerance values. However, the appropriate tolerance value range for each controllable variable is not uniform during the entire duration of each process. Rather, the appropriate value of each controllable variable changes with the passage of time in the course of the process. For this reason, rather than a single set of tolerance values for each controllable variable, it is necessary to establish a time dependent profile of said tolerance values which, ideally, would permit the setting of each controllable variable at each time interval during the course of the process. Another factor necessitating further control is the knowledge of the complex interactions between the various controllable variables and state variables at various stages in each process.

Due to the fact that processes related to living systems are non-linear and have random variables, these time profiles are, of necessity, ideal profiles, requiring refined control techniques more particularly described below. As an initial preparatory step in the process in accordance with the invention, the operator loads the ideal time profiles of the tolerance values of the particular controllable variables associated with the process in question into the computer as indicated by manual input block 12 operatively connected to process block 14, which in turn is connected to store block 16. Time profiles of the tolerance values of state variables may also be stored.

The next steps in the preparatory phase of the process in accordance with the invention are directed to the establishment of the status of the biochemical process apparatus. Thus, as indicated by process block 18, said apparatus is subjected to sterilization, if necessary, and as indicated by process block 20, said apparatus is otherwise readied for inoculation. The next step in the process calls for a decision as to whether the process should continue to the executive phase as indicated by decision block 22. In the embodiment of FIG. 1, this decision is controlled by the operator as indicated by manual input block 24. If the decision to continue is negative, the "NO" branch 26 would be followed and the process would pause as indicated in block 28. If the decision is to continue to the executive phase, branch 30 would be followed.

The analysis of the status and the control of the process in accordance with the invention is based on the real-time, on-line sensing of selected variables in the process. The first group of variables are the controllable variables which generally establish environmental conditions under which the biochemical process continues. A time profile of tolerance values was semi-permanently stored in action block 14 in connection with each of said controllable variables.

Instrumentation would also be provided for sensing certain state variables associated with the process. These state variables represent the measurable indicia of the status of the biochemical process. Examples of such state variables include agitator shaft torque, drive motor power uptake, concentration of oxygen and carbon dioxide in exit air, the redoxpotential of the culture liquid and metabolite concentrations in the liquid. The detected value of each of the controllable and state variables measured in the particular biochemical process in question is applied as the sensor input of input block 32 to the logging process step indicated by process block 34. The logging of the control and state variable data may be continuous, but preferably, would be conducted on a periodic basis dependent on the speed of the biochemical process, the operational speed of the particular computer system utilized, and the time required to perform the remaining steps of the executive phase of the process with regard to each set of logged data. Since biochemical processes are relatively slow, the logged data from the various sensors can be deemed to represent data at a particular instant in the process even if the various sensors are sequentially or randomly interrogated. If sequential interrogation is impossible, multiplexing techniques may be utilized for the essentially simultaneous detection of the values of each of the controllable and state variables.

With regard to each set of logged data, the process then calls for the comparison of said logged data with the then pertinent tolerance values as indicated by process block 36. Since a time profile of such tolerance values is stored, the comparison means must operate in conjunction with a time-keeping device so that the ideal tolerance value limits for each variable at each particular time is compared with the logged value of that variable at that time in the process. If any variable does not fall within the assigned tolerance values, then an error message would be produced, as indicated by block 38. Said error message may take the form of a printout, an audible, or a visible alarm, or any combination of such outputs.

The next step in the process calls for the logging of the controllable and state variables as indicated by process block 39. This logging operation is for the purpose of providing data storage and printout and is preferably performed at a less frequent rate than the logging of block 34. The results of said logging operation are stored in a suitable memory device indicated by store block 40 and provided as a printed output as indicated by print block 42.

The next step in the process calls for a decision as to whether any of the controllable variables must be changed in order to modify the environmental conditions or to bring the process back to the predicted course as indicated by the time profiles of tolerance values.

If the decision to control is affirmative, "YES" branch 44 from decision block 46 would be followed and the suitable controllable variable would be adjusted by means of control 48. As indicated by line 50, the results of this control operation are effectively fed back to the logging step represented by process block 34 through the detection of the new controllable variable value. Generally speaking, the control decision will be taken wherever there is a failure to satisfy a tolerance value. This failure can be caused by either a deviation in the controllable variable from the desired value or a change in the tolerance values. The change in tolerance values can be either the automatic result of following the time profile or the result of a manual change in the time profile by the operator.

Since only the controllable variables may be affirmatively controlled, a deviation in the valve of a state variable may or may not result in a decision to control, depending on the nature of the deviation. The decision to control under such circumstances can be a manual decision made by the operator, or can be an automatic decision made by the computer depending on criteria stored in the form of algorithms in the memory of said computer. These criteria would relate deviations in state variables to adjustment in controllable variables at various stages in the process and would dictate the nature of the adjustment of one or more controllable variables required to bring the deviating state variable back into tolerance levels. Due to the interactive nature of the controllable and state variables, this type of analysis requires the application of complex algorithms which utilize the data logged directly from the sensors or obtained through the data analysis subroutines of the computer program. Real-time applications of these algorithms can only be accomplished by means of a computer.

If the control decision is negative, the process continues along the "NO" path 51 to the analysis step represented by process block 52. This analysis step provides, through the means of the memory device represented by store block 54 and the print-out represented by print block 56, an on-line analysis of the characteristics and status of the biochemical process based on the detected values of the controllable and state variables. This analysis process consists generally of the calculation of further state variables from the data, which further state variables are generally not measurable, but are representative of the status of the biochemical process.

The output of this analysis may be utilized by the operator on an on-line, real-time basis to permit the selective control of the various controllable variables, through the adjustment of the time profile of tolerance values as well as by the computer, to permit the optimizing of the process and the complete control thereof. Such real-time control is possible only where on-line real-time process analysis for identification of the rheological, physiological and biochemical status of the process is performed.

After analysis of each set of logged data is completed, a determination is made as to whether the process is completed, as indicated by decision block 58. In the embodiment of FIG. 1, said completion decision block is operator controlled as indicated by input block 60. If the process is not complete, the "NO" path 62 is followed and the executive routine is repeated starting from the initial logging step of process block 34. If the determination is made that the process is at an end, the "YES" path 64 would be followed and the process would be stopped as indicated by block 66.

Depending on the degree of understanding of the process and the nature of the process characteristics which must be identified for control purposes, a series of such calculations may be performed based on various combinations of said further state variables, as well as the detected controllable and state variables. Values of state variables which define the status of the process from a biological viewpoint serve the purpose of process dynamics identification of the biochemical process.

In the case of application of the aforementioned method for pilot-plant scale research and development purposes, the product of the analysis step indicating the status of the biochemical process may justify the necessity of modification of one or more controllable variables in order to create new environmental conditions. The effect of the new environmental conditions will be reflected in the change of one or more state variables. The logged data and analysis results defining the effect of each environmental change on the biochemical process are stored and will serve as a functional element during the development of algorithms for the biological interactive control mode of process control.

In the case of application of the aforementioned method for production scale operation, the product of the data analysis sub-routines serves the purpose of process dynamics identification, on which basis the biological interactive control is performed by said computer or an operator.

The flow diagram of FIG. 1 is a generalized presentation of one embodiment of the method for process dynamics identification and process control of biochemical processes in accordance with the invention. One example of the application of this method is in connection with microbial cell propagation; however, this example does not exclude the application of the said method and apparatus for those biochemical processes where said process is accomplished by the function of a nondefined number of enzymes located in cells, as is the case in the propagation of mushrooms, photosynthetic and nonphotosynthetic plant cells, planktons, protozoa, animal cells, and phages and viruses in suspension culture, or by the enzymes in cell-free condition.

Figure 2:
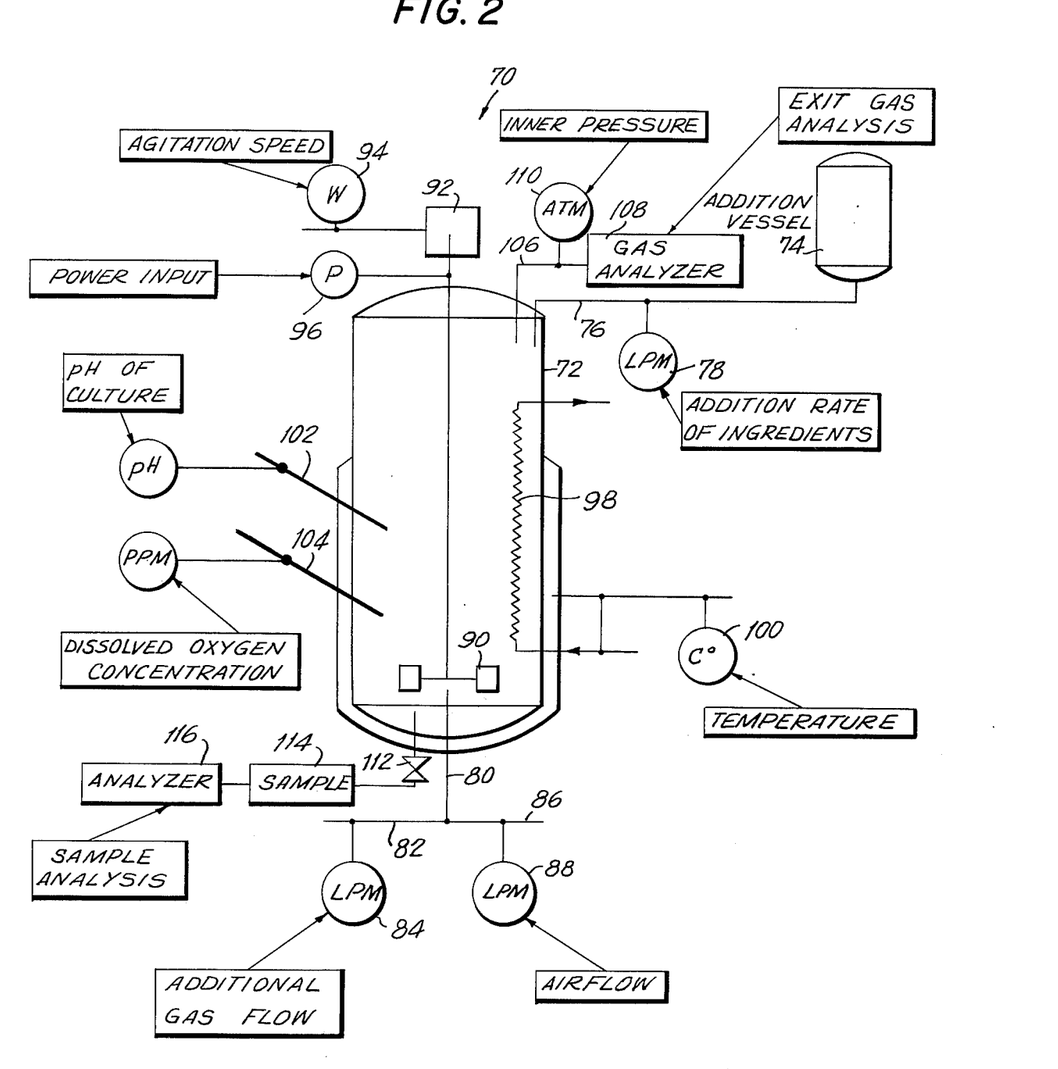
FIG. 2 is a schematic representation of a culture vessel and associated monitoring devices in accordance with the invention.

A culture vessel and instrumentation adapted for use in conjunction with the process in accordance with the invention is depicted schematically in FIG. 2. Said cell culture apparatus includes a main culture vessel 72. Ingredients are added to this culture vessel from a plurality of additional vessels illustrated by additional vessel 74 coupled by line 76 to the main vessel. A flow meter 78 would be connected to line 76 for monitoring the rate and volume of addition of the added ingredients. Similarly, air and additional gases would be added to the vessel through line 80 entering the vessel from the bottom region thereof. Additional gas is fed to line 80 along line 82, the rate of flow of said additional gas being monitored by flow meter 84, while sparge air would be applied to line 80 through line 86, the rate and volume of flow of said sparge air being measured by meter 88. The main vessel is subjected to agitation by means of paddle agitator 90 driven by motor 92. The speed of rotation of the agitator shaft is detected by speedometer 94. Power input to the agitator is measured by dynamometer 96.

Temperature within main culture vessel 72 is controlled by heater 98 and the actual temperature is detected by thermometer device 100. The pH of the culture within the main vessel is detected by pH electrode 102, while dissolved oxygen concentration is detected by a dissolved oxygen electrode 104. Gases escape from the vessel along line 106 and pass through a gas analyzer 108 which detects oxygen and carbon dioxide levels in said exit gases. Further, a pressure transducer 110 monitors line 106 for detecting the pressure within the main vessel.

Finally, a device including valve 112 is provided for taking small samples of the actual medium within the vessel at various stages in the process. The samples are deposited in a suitable sample container 114 for analysis by an otherwise automatically operated analyzer 116. Means would be provided for sterilizing the sampling arrangement after each use, so that an independent sample is obtained during each operation of the device.

While a specific group of sensors is described in connection with the cell culture apparatus of FIG. 2, because of its modular design other sensors could be incorporated if desired. Further, many of the variables could be detected by devices other than those described above. Thus, in the case of flow of ingredients from the addition vessels 74, carefully calibrated weight measurements could be performed on both the addition vessels and the main vessel 72, and the addition rate of the various ingredients could be calculated from these weight values. For use in conjunction with the process in accordance with the invention, the critical factor is that as many useful variables as possible be detected, and that the detected data be as accurate as possible. All of the sensing arrangements described in the apparatus of FIG. 2 would be provided as part of the sensor input represented by input block 32 of FIG. 1.

Figure 3:
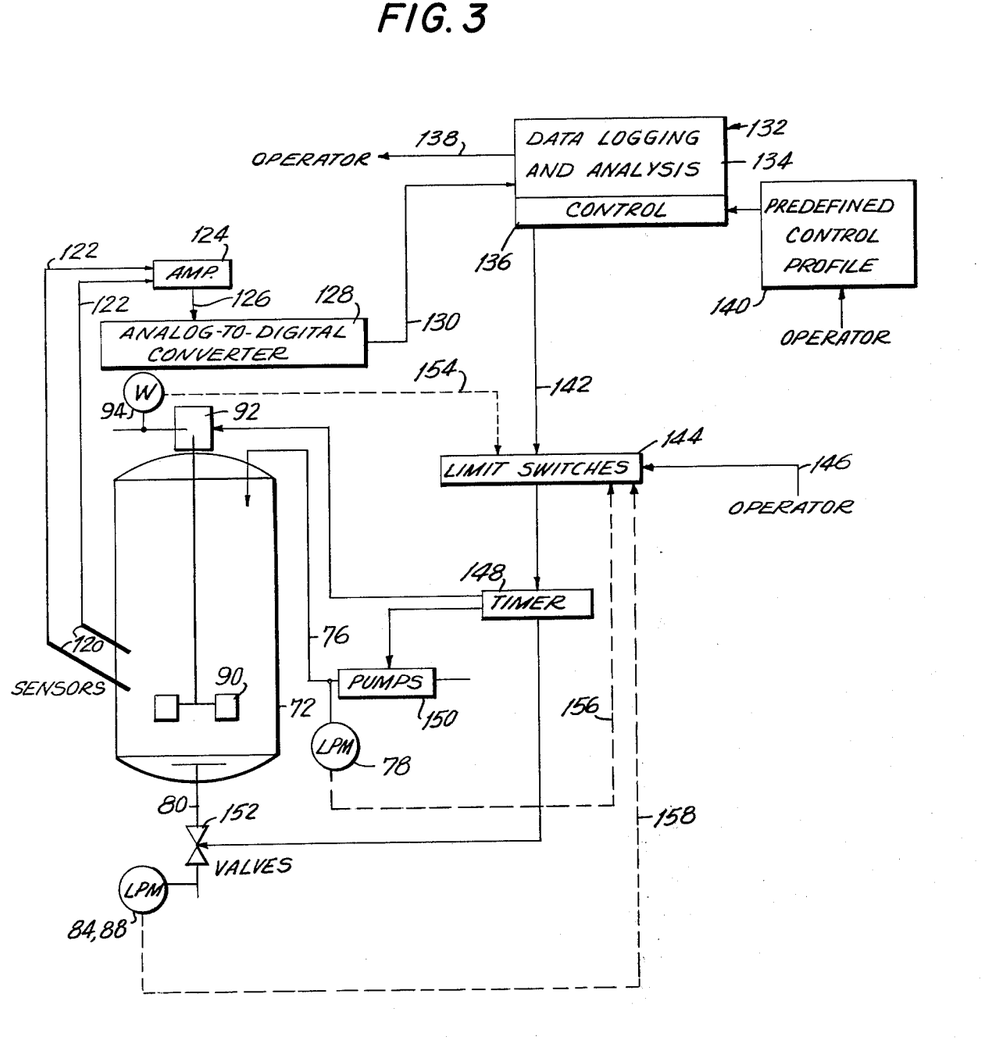
FIG. 3 is a schematic and block diagram illustrating the control function of the process of FIG. 1.

One embodiment of the interface between the cell culture apparatus of FIG. 2 and the computer is schematically illustrated in FIG. 3. The analog signal output of the respective sensors represented schematically by sensors 120 is applied along lines 122 to an amplifier 124. The signal from amplifier 124 is applied along line 126 to an analog-to-digital converter 128 which converts the amplified analog signal into machine readable digital signals, such as BCD signals. In one embodiment, the analog-to-digital converter can take the form of a digital panel meter which serves not only as a converter, but also provides a display of the sensor outputs. The digital signal from analog-to-digital converter 128 is applied along line 130 as an input to computer 132 through a suitable interface. For illustration purposes, computer 132 is divided into its data logging and analysis function represented by block 134 and its control function represented by block 136. An output represented by arrow 138 from the data logging and analysis portion of computer 132 is directed to the operator. The operator also controls an input function representative of the predefined control profile 140 or the on-line and real-time modification of the profile as discussed in connection with FIG. 1. This control profile is the time profile of the tolerance values of the variables. Said predefined control profile is applied to the control block 136 of the computer. Performing functions essentially in accordance with the process as described in FIG. 1, computer 132 produces digital control signals which are applied along line 142 to set limit switches 144 of analog controllers at the then pertinent tolerance values. Limit switches 144 may also be manually operated by the operator as indicated by line 146. In the particular example depicted in FIG. 3, limit switches 144 control a timer 148 which in turn regulates the operation of agitator motor 92, pumps 150 for controlling the addition of additional material along line 76, and valves 152 for controlling the application of additional gas and sparge air along line 80 into the main vessel.

The arrangement illustrated in FIG. 3 is an example of indirect digital-analog control over the various controllable variables. In an alternate approach, if speedometer 94 and flow meters 84, 88 and 78 were respectively connected so that their outputs were applied to limit switches 144, a closed-loop indirect control system would be defined. Thus, if the output of speedometer 94 were applied to limit switches 144 either directly, as indicated by dashed line 154, or through the computer, then the limit switches 144 would directly control the operation of motor 92, the computer acting merely to reset the tolerance values on the limit switches in response to the time profile and to the analysis performed therein. A similar connection from flow meter 78 is indicated by dashed line 156, while the connections from flow meters 84 and 88 are indicated by dashed line 158.

On the other hand, direct digital control may be applied if said computer directly participates in the process by direct control over the control elements. In this case, the control function of said computer is performed on the basis of information both on the position of the control elements and on the biological status of the process. All of the above-described control approaches may be applied to the method for controlling biochemical processes in accordance with the invention.

The behavior of many biochemical processes, such as fermentation processes, is characterized by a plurality of stages, each stage in the process being characterized by specific metabolic activities. It has been found that analysis of dynamic behavior of growth and metabolic activity in each stage requires different mathematical treatment and that different environmental conditions are required for the different stages. The method for control of biochemical processes in accordance with the invention relies on the definition of optimum environmental conditions for each stage and the identification of the biological status of the process as well as the selection of the suitable environmental conditions through analysis of algorithms for the process dynamics of each stage of the process. One factor which must be considered is the interaction between the environment defined by the controllable variables and the biological status defined by the biological state variables. Biological interactive control of the biochemical process requires the identification and consideration of the rheological, physiological and biochemical characteristics of the process.

Figure 4:
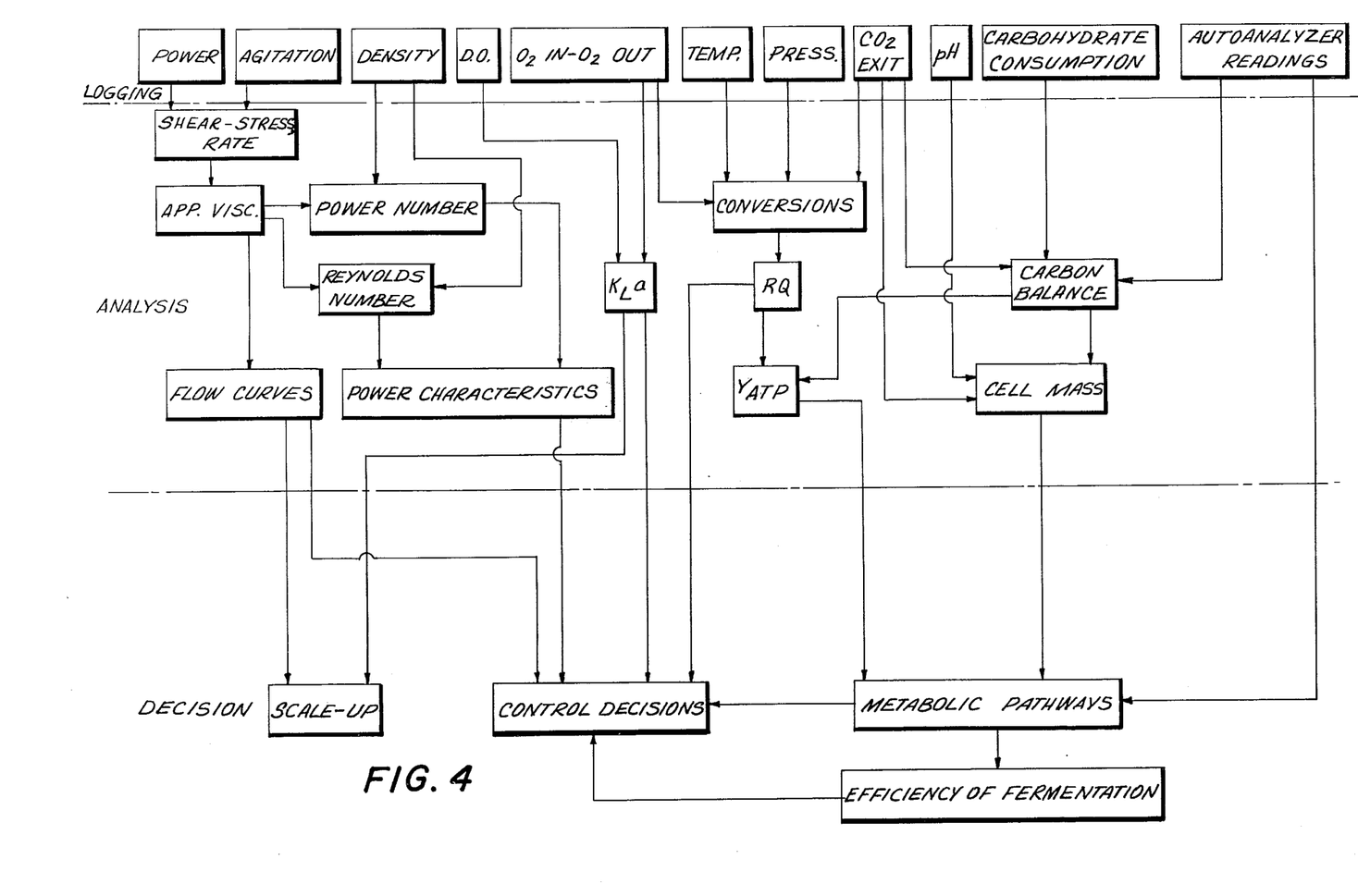
FIG. 4 is a flow chart illustrating the calculation steps in connection with the calculation of further state variables from detected state and controllable variables, leading to the identification of the dynamics which reflect the rheological, physiological and biochemical status of a biochemical process including fermentation in accordance with the invention.

FIG. 4 illustrates an on-line, real-time operating computer program such as might be performed by the computer pursuant to the method in accordance with the invention. The top line represents the variable data input logged by the computer in terms of engineering units of sensor data obtained during data acquisition. These data consist of both controllable variables and measurable state variables. The method of multivariation of these variables is represented in the analysis section wherein further, otherwise unmeasurable, state variables are calculated. Thus, apparent viscosity (App. Visc.) is a function of shear-stress rate, which is a function of power and agitation. This further state variable is, itself, used in the calculation of further state variables, such as power number, Reynolds number, as well as flow characteristic of the culture liquid. Other significant characteristics represented by further state variables are the mass transfer coefficient ($K_L a$), which is a function of dissolved oxygen (D.O.) and oxygen input and output, the respiratory quotient (RQ), and the adenosine-tri-phosphate yield ($Y_{ATP}$). The results of the analysis may be used for a number of purposes, as also illustrated in FIG. 4. Of initial importance is their application in the making of decisions pursuant to the method in accordance with the invention. The calculated data could also be utilized for scale-up from experimental to commercial scale operations, as well as analytical considerations such as evaluation of the efficiency of the process and the identification of metabolic pathways.

The extent to which the program of analysis illustrated in FIG. 4 can be followed depends on the experimental data available and the mathematical models available with regard to each stage of the fermentation process. Where a full group of mathematical models is available, so that the entire program of analysis may be followed, complete process control is possible. This complete process control can take the form of operator intervention, as indicated in the embodiment of FIG. 1, or can take the form of automatic full process control accomplished by either digital-analog or direct digital control.

Figure 5:
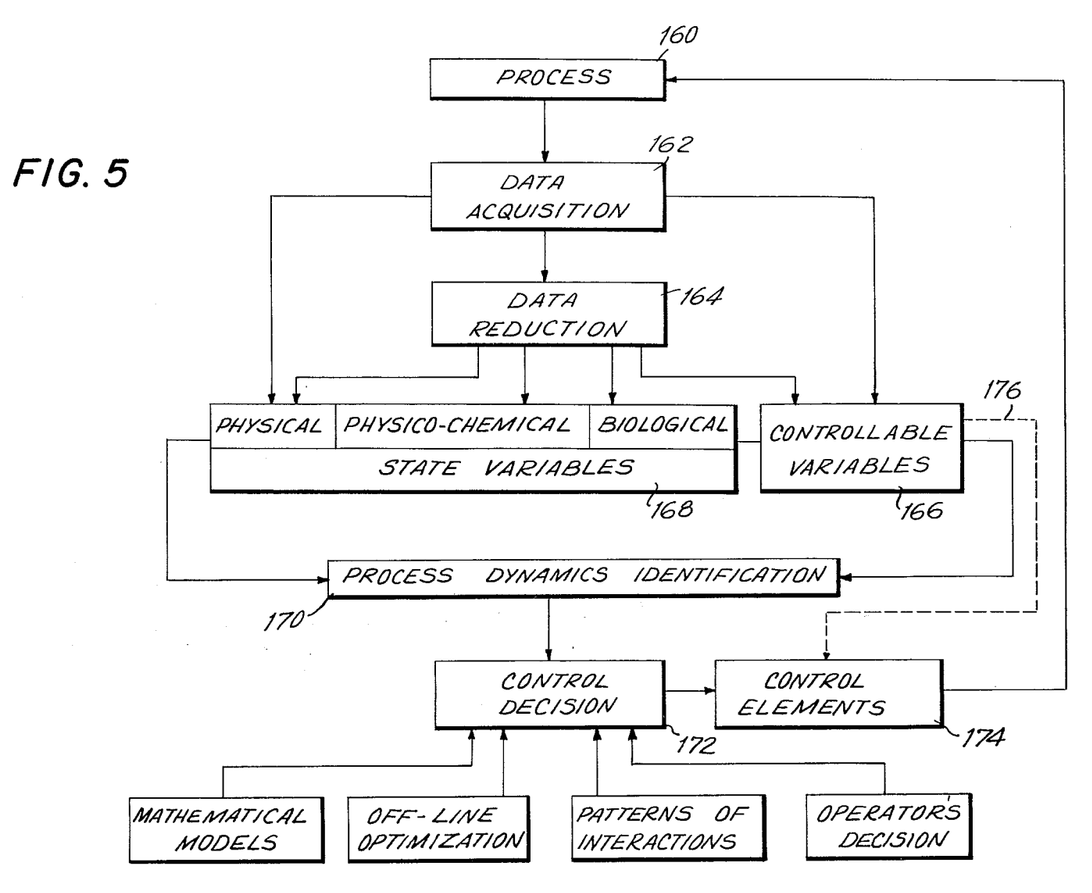
FIG. 5 is a flow diagram of a second embodiment of the method of controlling biochemical processes in accordance with the invention.

Such an automatic full process control system is illustrated in the flow chart of FIG. 5. In said embodiment, the biochemical process represented by block 160 is monitored and the detected controllable and state variable data are received as indicated by data acquisition block 62 and analyzed in accordance with the above-described principles as indicated in data reduction block 164. The product of this analysis is represented by a group of controllable variables indicated by block 166 and a group of state variables indicated by block 168. The state variables include not only the measurable state variables but the further state variables representing the results of analysis as indicated, by way of example, in FIG. 4. Said state variables represent the physical, physico-chemical and biological characteristics of the process at each particular stage and form the basis of process dynamics identification. From the array of state variables and controllable variables, the process dynamics, and therefore the particular stage in the process at which the data were obtained, are then determined as indicated by process dynamics identification block 170. From the identification of the stage and the information on the interactions between the environmental and the living system, biological interactive control decisions are made as to the setting of the various controllable variables, as indicated by control decision block 172. The arrangement of controllable variables creates the suitable environmental conditions which either fit the physical, physico-chemical, physiological, and biochemical status of the process or result in the desired modification of one or more state variables.

The control decisions are based on stored mathematical models and patterns of interactions, off-line optimumization, and the manual input of the operator. The ultimate control decision is then applied to the control elements 174, which are operatively coupled to the process apparatus to control the process. If desired, the control may be performed by digital-analog control, in which case the actual regulation of the controllable variables is automatically accomplished by the control elements, the product of the control decision block of the computer being merely the readjustment of the time profile tolerance values associated with each of the controllable variables. As an alternate approach, direct digital control is accomplished, as indicated by dashed line 176, in which case the biological interactive control is based on both the state variables describing the status of the control elements and the biological status of the process.

In order to simplify the process in accordance with the invention, certain techniques may be used. One such technique is the pivot-finding strategy, wherein it is assumed that there is a mechanism in each stage of the biochemical process which is the pivot of that stage of the process, and although this biochemical mechanism is governed by several control variables, there is a pivotal control variable upon which the mechanism depends. An example of this approach is the consideration of respiration as the pivot biological state variable in aerobic cell metabolism. Of course, it is still necessary to determine the interactive effect of the adjustment of the "pivot" controllable variable on the various state variables, but generally, manipulation of the pivot controllable variable produces the most effective control techniques. Before a controllable variable can be considered to be used for this purpose, the variable must have the following characteristics:

1. There is a measurable or computable response to the effect;
2. The response is proportional to the effect;
3. There is a maximum minimum effect-response curve; and
4. There is no irreversible damage in the system when the effect is actuated.

The foregoing embodiments of the apparatus and method in accordance with the invention are applicable to all biochemical processes catalyzed by a nondefined number of enzymes. One such application is fermentation. Applying the foregoing principles to fermentation processes, it has been found that temperature, pH, concentration and ratio of substrates and precursors, dissolved $O_2$ and dissolved $CO_2$ ($HCO_3^-$) are effective controllable variables, assuming an aerobic culture and the maintenance of dissolved oxygen concentration above its critical value.

Although, for the sake of simplicity, the application of a single biochemical process to a single computer is described herein, one computer can be applied to more than one chemical process, such as a plurality of fermentors. Each computer can be connected to more than one control/report terminal.

It will thus be seen that the objects set forth above, among those made apparent from the preceding description, are efficiently attained, and since certain changes may be made in carrying out the above process and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An apparatus for control of biochemical processes comprising vessel means within which said process is to be performed; means for adding controlled amounts of substances required for said process into said vessel means; means for monitoring a plurality of predetermined controllable and dependent variables in said process; calculating means for calculating at least one further, not directly measurable dependent variable representative of the status of the biochemical process on a real-time, on-line basis from said detected controllable and dependent variables; and control means for interactively regulating the values of said controllable variables in response to said calculated values of said further dependent variable to bring said further dependent variable to predetermined levels to create the desired environmental conditions for the biochemical process.

2. An apparatus as recited in claim 1, wherein said biochemical process is performed by one or more cellbound and/or cellfree enzymes.

3. An apparatus as recited in claim 1, wherein said monitoring means includes means for monitoring temperature, pH, concentration and ratio of substrates and precursors, dissolved oxygen and dissolved carbon dioxide ($HCO_3^-$).

4. An apparatus as recited in claim 1, wherein said calculating means is adapted to calculate further state variables representative of the rheological conditions of the culture liquid.

5. An apparatus as recited in claim 1, wherein said calculating means is adapted to calculate further state variables representative of the physiological status of the process.

6. An apparatus as recited in claim 1, wherein said calculating means is adapted to calculate further state variables representative of the biochemical status of the process.

7. An apparatus as recited in claim 1, wherein said process is a fermentation process.

8. An apparatus as recited in claim 1, wherein said monitoring means includes means for periodically physically sampling the contents of said vessel means and performing on-line, real-time analysis of said samples.

9. An apparatus as recited in claim 1, wherein said control means is adapted for the regulation of said controllable variables in accordance with time profiles of tolerance values in response to detected controllable variable values and includes means for automatically setting said time profile tolerance values in response to said calculated further state values.

* * * * *

UNITED STATES PATENT OFFICE
CERTIFICATE OF CORRECTION

PATENT NO. : 3,926,738
DATED : December 16, 1975
INVENTOR(S) : John D. Wilson; Laszlo K. Nyiri; Arthur E. Humphrey; and Clyde S. Harmes, III.

It is certified that error appears in the above-identified patent and that said Letters Patent are hereby corrected as shown below:

In the cover page, cancel:

[75] Inventors: John D. Wilson, Mertztown;
New Brunswick Scientific Co., Inc.
New Brunswick, N.J.

[73] Assignees: New Brunswich Scientific Co., Inc.
New Brunswich, N.J.

and substitute the following therefor:

[75] Inventors: John D. Wilson, Mertztown;
Laszlo K. Nyiri, Bethlehem;
Arthur E. Humphrey, Media;
Clyde S. Harmes, III, Schnecksville,
all of Pa.

[73] Assignee: New Brunswick Scientific Co., Inc.
New Brunswick, N.J.

Signed and Sealed this twenty-third Day of March 1976

[SEAL]

Attest:

RUTH C. MASON
Attesting Officer

C. MARSHALL DANN
Commissioner of Patents and Trademarks